US010575366B2

(12) United States Patent
Combellas et al.

(10) Patent No.: US 10,575,366 B2
(45) Date of Patent: *Feb. 25, 2020

(54) LAST RESOURCE DISASTER ROUTING IN A TELECOMMUNICATIONS NETWORK

(71) Applicant: LEVEL 3 COMMUNICATIONS, LLC, Broomfield, CO (US)

(72) Inventors: Claudia M. Combellas, Centennial, CO (US); Dana A. Johnston, Highlands Ranch, CO (US); Adam C. Uzelac, Rochester, NY (US); David A. Tschirhart, Dale, TX (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,173

(22) Filed: Jul. 10, 2019

(65) Prior Publication Data
US 2019/0335533 A1 Oct. 31, 2019

Related U.S. Application Data

(63) Continuation of application No. 15/943,419, filed on Apr. 2, 2018, now Pat. No. 10,362,631.
(Continued)

(51) Int. Cl.
H04W 76/50 (2018.01)
H04W 4/90 (2018.01)
(Continued)

(52) U.S. Cl.
CPC .............. *H04W 76/50* (2018.02); *H04L 45/22* (2013.01); *H04W 4/90* (2018.02); *H04W 88/06* (2013.01); *H04W 88/10* (2013.01)

(58) Field of Classification Search
CPC ......... H04L 45/28; H04L 45/22; H04L 45/24; H04L 45/02; H04L 69/40; H04L 41/0663;
(Continued)

(56) References Cited

U.S. PATENT DOCUMENTS 7,583,602 B2 * 9/2009 Bejerano ............... H04W 40/10
370/238
8,228,931 B1 * 7/2012 Wallace ................ H04L 47/803
370/428
(Continued)

Primary Examiner — Dung Hong

(57) ABSTRACT

Aspects of the present disclosure involve systems, methods, computer program products, and the like, for providing disaster routing of particular communications through a telecommunications network during a network outage. The disaster routing may ensure that communications from a particular source or to a particular destination are connected to the destination even during times when portions of the network may be inoperable. In one particular embodiment, the disaster routing may be performed for emergency communications received at the network and connected to one or more emergency services configured to receive the emergency communication. However, the disaster routing mechanisms and techniques described herein may be applied or available to any type of communication from any source or customer to the telecommunications network.

20 Claims, 5 Drawing Sheets

Related U.S. Application Data

(60) Provisional application No. 62/480,880, filed on Apr. 3, 2017.

(51) Int. Cl.
  *H04L 12/707* (2013.01)
  *H04W 88/06* (2009.01)
  *H04W 88/10* (2009.01)

(58) Field of Classification Search
  CPC .............. H04L 49/557; H04L 41/0654; H04Q 2011/0081; H04Q 11/0005
  See application file for complete search history.

(56) References Cited

U.S. PATENT DOCUMENTS

| | | | | |
|---|---|---|---|---|
| 8,369,208 B2* | 2/2013 | Opavsky | ............. | G06F 11/2005 370/216 |
| 8,879,383 B1* | 11/2014 | Cirkovic | ................. | H04L 45/00 370/219 |
| 9,838,246 B1* | 12/2017 | Hegde | ................. | H04L 41/0668 |
| 10,362,631 B2* | 7/2019 | Combellas | .............. | H04W 4/90 |
| 2002/0128023 A1* | 9/2002 | Forte | ........................ | H04M 3/42 455/461 |
| 2005/0002339 A1* | 1/2005 | Patil | ........................ | H04L 45/00 370/237 |
| 2006/0078095 A1* | 4/2006 | Crago | .................. | H04M 3/5116 379/45 |
| 2006/0274645 A1* | 12/2006 | Bradford | ............. | H04L 41/0677 370/216 |
| 2007/0086429 A1* | 4/2007 | Lawrence | ............... | H04L 45/04 370/351 |
| 2007/0214280 A1* | 9/2007 | Patel | ....................... | H04L 45/04 709/239 |
| 2007/0217342 A1* | 9/2007 | Yang | ....................... | H04L 45/10 370/252 |
| 2008/0117806 A1* | 5/2008 | Xu | ............................ | H04J 3/14 370/217 |
| 2008/0232347 A1* | 9/2008 | Chao | ........................ | H04L 45/00 370/351 |
| 2009/0157371 A1* | 6/2009 | Conway | .................. | H04L 41/06 703/13 |
| 2013/0162756 A1* | 6/2013 | Ellison | .................. | H04L 65/403 348/14.08 |
| 2013/0335513 A1* | 12/2013 | Broadworth | ............. | H04N 7/15 348/14.08 |
| 2013/0336170 A1* | 12/2013 | Broadworth | .......... | H04L 65/403 370/260 |
| 2014/0032773 A1* | 1/2014 | Peter | ..................... | H04L 67/142 709/228 |
| 2014/0147106 A1* | 5/2014 | Ahuja | .................. | H04B 10/032 398/5 |
| 2015/0156321 A1* | 6/2015 | Abnett | ................ | G06F 16/2455 379/45 |
| 2015/0249587 A1* | 9/2015 | Kozat | ..................... | H04L 43/10 370/222 |
| 2015/0295818 A1* | 10/2015 | Hayashitani | ............ | H04L 45/28 370/221 |
| 2015/0331762 A1* | 11/2015 | Wollbrand | ............ | H04L 61/103 714/4.11 |
| 2016/0191325 A1* | 6/2016 | Pacella | .................... | H04L 41/12 370/254 |
| 2017/0078495 A1* | 3/2017 | Tschirhart | ......... | H04M 15/8044 |
| 2017/0149983 A1* | 5/2017 | Vagelos | ................ | H04M 3/5116 |
| 2018/0288828 A1 | 10/2018 | Combellas et al. | | |

* cited by examiner

LAST RESOURCE DISASTER ROUTING IN A TELECOMMUNICATIONS NETWORK

CROSS-REFERENCE TO RELATED APPLICATIONS

This application is a continuation of U.S. patent application Ser. No. 15/943,419, filed Apr. 2, 2018, now U.S. Pat. No. 10,362,631, which claims the benefit of and priority to U.S. Provisional Patent Application No. 62/480,880, filed Apr. 3, 2017, the entire contents of each of which are incorporated herein by reference.

TECHNICAL FIELD

Aspects of the present disclosure generally relate to systems and methods for implementing a telecommunications network, and more specifically for providing last resource disaster redundancy for communications from a particular source or for a particular destination.

BACKGROUND

Telecommunication networks provide for the transmission of information across some distance through terrestrial, wireless and/or satellite communication networks. Such communications may involve voice, data or multimedia information, among others. In some instances, however, one or more of the components of the telecommunications network may malfunction or otherwise become inoperable such that transmission of communications through the network is negatively impacted. Such outages may occur for any number of reasons, including but not limited to power loss at the networking components, improper routing signaling within the network, and incorrect provisioning of the network devices. Operators or administrators of such telecommunications networks thus often provide mechanisms or procedures within the network to respond to network outages, referred to herein as disaster recovery procedures or mechanisms.

One common type of disaster recovery mechanism within telecommunications networks is to provide redundant components or paths through the network such that, if a preferred transmission path through the network is affected by the network outage, traffic can still be transmitted through the network on the redundant path. However, some large network outages may affect both the primary transmission path and the redundant transmission path through the network. In these circumstances, the transmission of the data packets through the affected transmission path is ceased until the network outage is rectified. For particularly important communications, such as communications to access emergency services, it may be desirable to have a last resort disaster recovery procedure in place for large scale network outages to ensure that such communications are connected to the intended destination device. It is with these issues in mind, among others, that various aspects of the present disclosure were developed.

SUMMARY

One implementation of the present disclosure may take the form of a method for operating a telecommunications network. The method may include the operations of receiving a communication at an edge device of a first telecommunications network identifying the communication as a particular type of network communication associated with a disaster recovery service, and determining a failed route path through the first telecommunications network for the received communication. In response to the failed route path, the method may further include transmitting the communication to a disaster recovery network device in response to the failed route path determination and the particular type of network communication identification, the disaster recovery network device automatically transmitting the communication to a second telecommunications network different from the first telecommunications network.

Another implementation of the present disclosure may take the form of a networking device. The network device may include at least one communication port receiving a communication intended for a destination device in communication with a first telecommunications network, a processing device, and a computer-readable medium connected to the processing device configured to store information and instructions that are executed by the processing device. When executed, the operations of obtaining a destination device identifier associated with the destination device from the received communication, identifying the communication as a particular type of network communication associated with a disaster recovery service, and requesting routing information from at least one routing device for the communication based on the destination device identifier are performed. Additional operations may include determining a failed route path through the first telecommunications network for the destination device based on the request of routing information from the at least one routing device and transmitting the communication to a disaster recovery network device in response to the determined failed route path and the particular type of network communication identification, the disaster recovery network device automatically transmitting the communication to a second telecommunications network different from the first telecommunications network.

Yet another implementation of the present disclosure may take the form of a telecommunications network. The network may include an ingress edge device receiving a communication from an ingress network to a first telecommunications network, obtaining a destination device identifier associated with the destination device from the received communication, and identifying the communication as a particular type of network communication associated with a disaster recovery service and a routing device receiving a request for routing information from the ingress edge device based on the destination device identifier and transmitting a failed route path indicator for the destination device identifier to the ingress edge device. The network may also include a disaster recovery network device receiving the communication from the ingress edge device and automatically transmitting the communication to a second telecommunications network different from the first telecommunications network.

DETAILED DESCRIPTION

Aspects of the present disclosure involve systems, methods, computer program products, and the like, for providing disaster routing of particular communications through a telecommunications network during a network outage. The disaster routing may ensure that communications from a particular source or to a particular destination are connected to the destination even during times when portions of the network may be inoperable. In one particular embodiment, the disaster routing may be performed for emergency communications received at the network and connected to one or more emergency services configured to receive the emergency communication. However, the disaster routing mechanisms and techniques described herein may be applied or available to any type of communication from any source or customer to the telecommunications network.

In general, a networking device at an ingress edge of the telecommunications network is configured to route the received communication, typically involving data packets, through the telecommunications network to a destination device, either a device within the network or to an egress device of the network that connects to another telecommunications network. This routing is often based on routing information (such as an identification of a destination device or network) included in the communication packet or packets. In some instances, however, the ingress edge device may not be able to transmit the communication through the telecommunications network due to an outage or other inoperable state of one or more components of the network. In this circumstance, the ingress edge device may be configured to identify the occurrence of an outage and route the received communication to a dedicated last resource disaster routing component. The dedicated last resource routing component may automatically route the received communication to a secondary (or third party) telecommunications network for connection to the destination. In other words, the edge device may recognize a potential network outage and offload certain communications to a potentially unaffected network to ensure that the communication is provided to the destination device. In one particular embodiment, the communication may be an emergency communication (such as a 911 telephone call) intended to request emergency services. In other embodiments, the communication may be from a particular customer of the telecommunications network that has contracted with a network administrator to ensure communications reach the intended destination device, even during times of a network outage. In this manner, communications designated by the network as important may be routed to the intended destination if one or more of the transmission paths through the network are inoperable due to a network outage.

Figure 1:
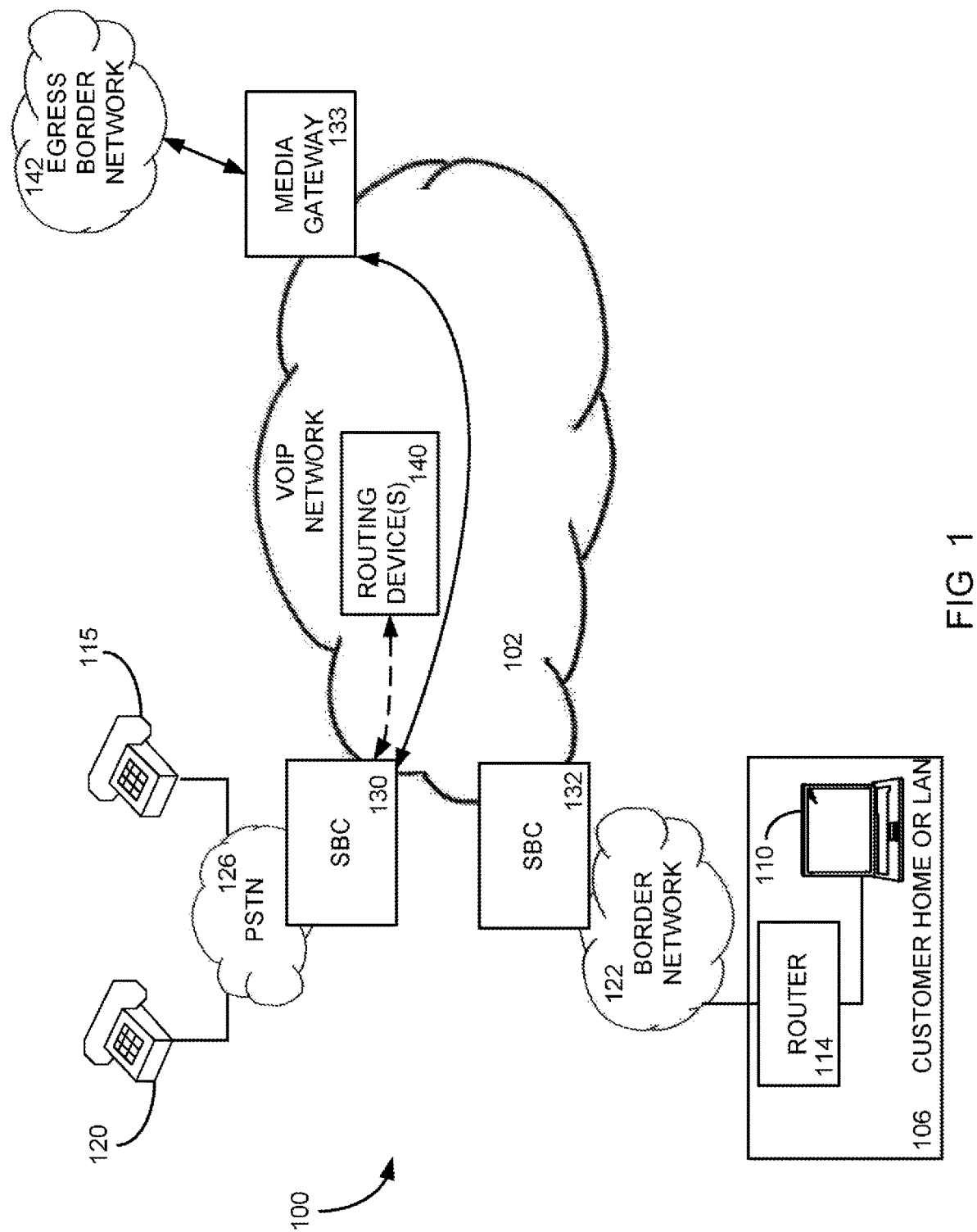
FIG. 1 schematic diagram illustrating an exemplary Internet Protocol (IP) operating environment in accordance with one embodiment.

Beginning in FIG. 1, an exemplary operating environment 100 that may utilize a last resource disaster routing mechanism is described. In general, the environment 100 provides for establishing communication sessions between network users and for providing one or more network services to network users. For example, users to the network 100 may communicate with each other through communication devices, including voice communications and video communications. With specific reference to FIG. 1, the environment 100 includes an IP network 102, which may be provided by a wholesale network service provider. However, while the environment 100 of FIG. 1 shows a configuration using the IP network 102; it should be appreciated that portions of the network may include non IP-based routing. For example, network 102 may include devices utilizing time division multiplexing (TDM) or plain old telephone service (POTS) switching. In general, the network 102 of FIG. 1 may include any communication network devices known or hereafter developed.

The IP network 102 includes numerous components such as, but not limited to gateways, routers, switches, and registrars, which enable communication and/or provides services across the IP network 102, but are not shown or described in detail here because those skilled in the art will readily understand these components. In some instances, those communications may be exchanged across the network 102 over long distances. More relevant to this description is the interaction and communication between the IP network 102 and other entities, such as the one or more customer home or business local area networks (LANs) 106, where a user of the network will connect with the network.

Customer network 106 can include communication devices such as, but not limited to, a personal computer or a telephone 110 connected to a router/firewall 114. Although shown in FIG. 1 as computer 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the IP network 102 to other communication devices, such as another customer network 126 and/or the Internet 142. Components of the customer network 106 are typically home- or business-based, but they can be relocated and may be designed for easy portability. For example, the communication device 110 may be wireless (e.g., cellular) telephone, smart phone, tablet or portable laptop computer. In some embodiments, multiple communication devices in diverse locations that are owned or operated by a particular entity or customer may be connected through the IP network 102.

The customer network 106 typically connects to the IP network 102 via a border network 122, such as one provided by an Internet Service Provider (ISP). The border network 122 is generally provided and maintained by a business or organization such as a local telephone company or cable company. The border network 122 may provide network/communication-related services to their customers. In addition, the communication device 120 accesses, and is accessed by, the IP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the IP Network 102 through a network edge device, such as session border controller (SBC) 130, 132 or media gateway 133. In general, any network edge device, including media gateways, may also be utilized within the network 102. For ease of discussion, only three communication devices 110, 115, 120 are shown communicating with the IP network 102; however, numerous such devices, and other devices, may be connected with the network, which is equipped to handle enormous numbers of simultaneous calls and/or other IP-based communications.

In many IP networks 102, communications through the network are routed based on a Session Initiation Protocol Uniform Resource Identifier (SIP URI) protocol. For example, a user to the network 102 may utilize a communications device (such as a telephone) to dial a telephone number (TN) for the destination communication device. The user's device or other component within the network environment 100 converts the TN into a SIP URI associated with the destination communication device. The SIP URI is then utilized by the network 102 to route the communication through the network to the destination device associated with the dialed TN utilizing IP or non-IP based signaling. One type of non-IP based signaling is an SS7 signaling protocol, although any type of signaling protocol may be utilized to route the communication through the network.

Long distance communications may be transmitted across the IP network 102 between two communication devices. For example, a user to the network 102 may utilize a communications device (such as telephone 120) to dial a telephone number for a destination communication device, perhaps one reachable through border network 142. The communication is transmitted through the PTSN 126 network to the SBC 130. The SBC 130, in turn, provides routing information included in the communication to a routing device 140 included in the network 102. The routing device 140 utilizes the routing information to determine an egress network 142 from the IP network 102 and provides terminating information to the SBC 130. The SBC 130 then routes the communication through the network 102 to an egress gateway (such as media gateway 133) associated with the egress network 142. The media gateway 133 provides the communication to the border egress network 142 for termination at the destination device connected to or otherwise associated with the egress network. In this manner, communications may be transmitted through the network 102 from an originating device to a terminating device.

Figure 2:
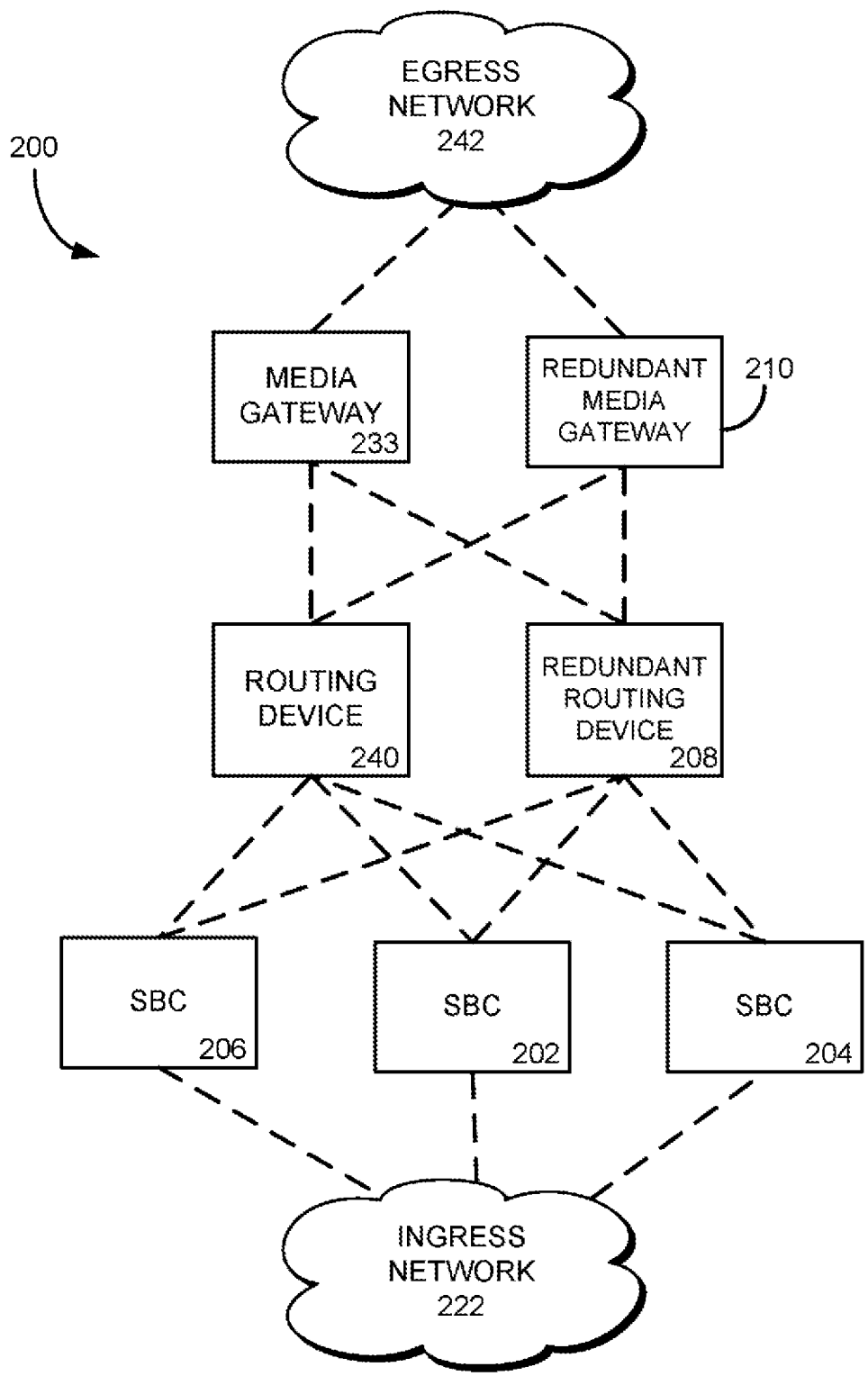
FIG. 2 is a first schematic network diagram illustrating a redundant architecture within the network for disaster recovery during a network outage.

FIG. 2 illustrates a first schematic network diagram 200 illustrating a redundant architecture within the network for disaster recovery during a network outage. The components of the system 200 of FIG. 2 are the same or similar to those components described above with reference to FIG. 1. Thus, a customer 222 is connected to a telecommunications network 200 for transmitting and receiving communications with the network. The customer 222 may be a border network, PSTN, a LAN, a communication device (such as a telephone, cell phone, or computer), and the like as described above.

As also mentioned above, the customer network 222 connects to the telecommunications network 202 through one or more ingress edge devices, such as SBC 202 and SBC 206. Each SBC 202-206 may be connected or otherwise in communication with one or more routing devices 240 and one or more egress edge devices, such as media gateway 233. Each media gateway 233 may connect to or otherwise be in communication with a destination or egress network 242, through which a received communication may be connected to a destination communication device (not shown), such as a user's telephone. As should be appreciated, communications may also traverse the network 200 in the opposite direction from the egress network 242, through the network to the originating customer 222, for the exchange of communication data packets between communication devices.

A typical call flow for communications through the network is as follows. A user to the network 200 utilizes an origination communications device (such as a telephone) to dial a telephone number for a destination communication device reachable through egress network 242. The communication is transmitted through the ingress customer network 222 to at least one SBC 206 of the network 200. As described above, the SBC 206 provides routing information included in the communication to routing device 240 and the routing device utilizes a routing information table to determine an egress network 242 based on the dialed telephone number. The routing device 240 provides routing information to the SBC 206 to the egress edge device (media gateway 233) associated with the destination device. The SBC 206 then routes the communication through the network 200 to media gateway 233 associated with the egress network 242. The media gateway 233 provides the communication to the egress network 242 for termination at the destination device. In some embodiments, the operations of the media gateway 233 and redundant media gateway 210 may be performed by a session border controller device.

In some instances, however, one or more of the components of the network 200 may fail or enter a failure state due to any number of reasons such that the network component cannot process communications. For example SBC 206 may experience a failure, such as a loss of power at a site hosting the SBC or due to an improper provisioning of the device within the network. In such circumstances, the SBC 206 cannot receive the communication from the customer network 222 and process the communication according to the identified destination device. Thus, the communication packet is often dropped by the network such that communications between the sending device and the destination device does not occur.

To address the failure of a network device, the customer network 222 may be instructed to provide incoming communications to a secondary or backup edge device, such as SBC 202 of the network 200. Other failed components within the network (perhaps caused by a power failure at a site hosting many network devices) may cause the communication to be transmitted to even further redundant components. For example, routing device 240 may be in a failure state such that routing information for a received component is not available from the routing device. In such instances, the SBC 202 may request routing information from a secondary or redundant routing device 208 to receive destination routing information. A redundant media gateway 210 may also be present in the network 200 for redundant access to the egress network 242. In this manner, the network 200 may include any number of redundant devices, components, or transmission paths to address a failure at one or more components of the network.

Despite the redundancy of the telecommunications network 200, dropped communications through the network may still occur during widespread network outages. For example, both routing device 240 and redundant routing device 206 of the network 200 may be in a failure state at the same time. While other redundant paths or components of the network 200 may exist, it is still possible that widespread outages in the network 200 affecting many network devices at once may operate to prevent certain communications from any transmission path through the network, resulting in the packet being dropped or lost. In another example, each routing device 240, 208 of the network 200 may be mistakenly configured to prevent certain communications from transmitting through the network, such as communications mistakenly identified as part of an attack on the network.

Thus, although some communications may be legitimate packets, the network may mistakenly identify those communications as illegitimate and drop those packets from transmission through the network 202.

Figure 3:
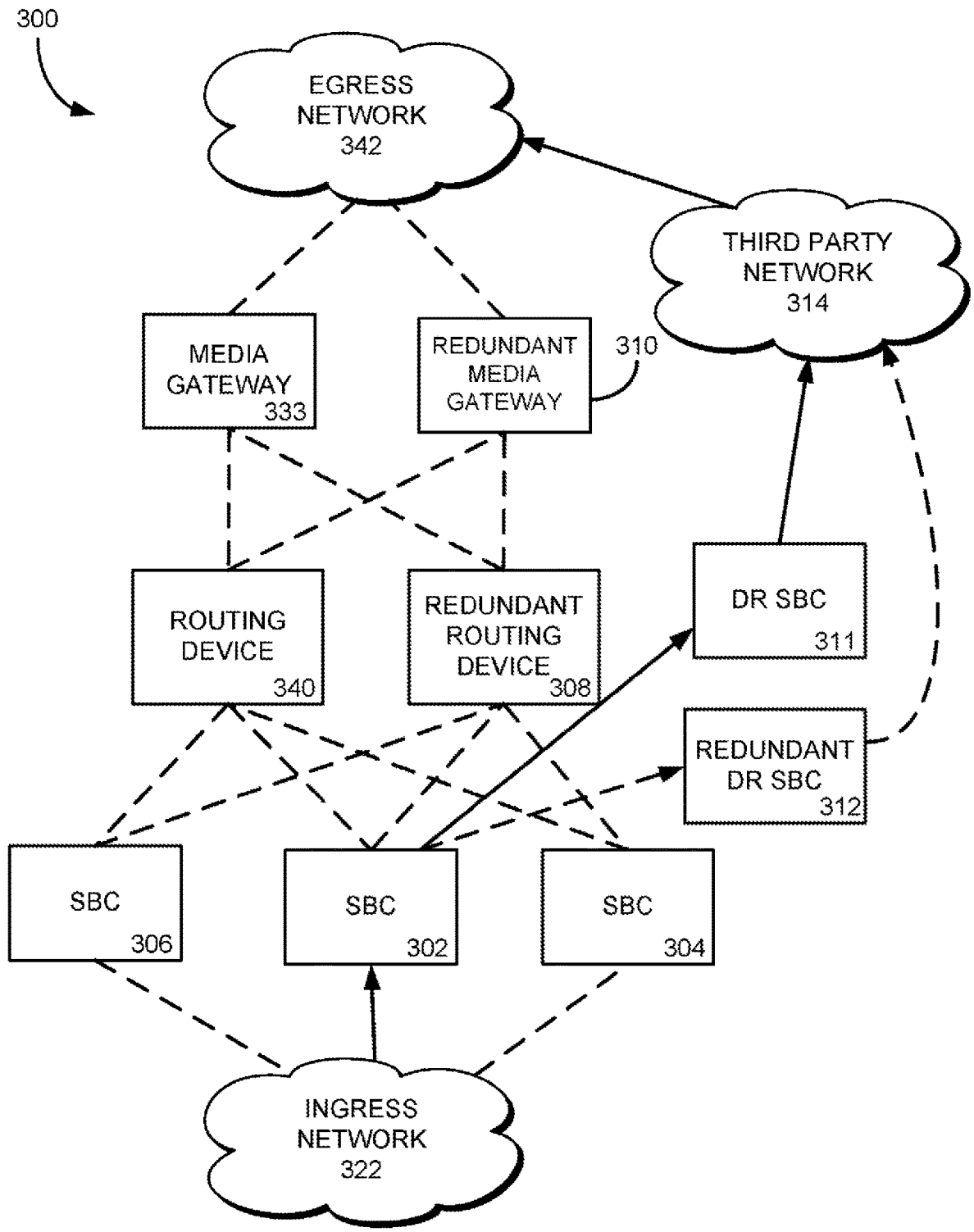
FIG. 3 is a second schematic network diagram illustrating a last resource disaster recovery architecture for use during a network outage.

To address large-scale outages in a network 200, a last resource disaster recovery mechanism or network structure may be implemented within the network 200 to ensure transmission of communications through the network, even during moments of widespread outages throughout the network. In particular, FIG. 3 is a second schematic network diagram 300 illustrating a last resource disaster recovery architecture within a telecommunications network for use during a network outage. The network 300 of FIG. 3 includes many of the same components as that described above with reference to FIGS. 1 and 2. For example, the network 300 may include a customer network 322, SBC edge devices 302-306, routing devices 340, 308, edge devices 333, 310, and egress network 342. These components are interconnected so that each component may communicate with another component through the network. Call flow or other operations of the network 300 may also be similar as described above to provide redundancy in transmission of packets or communications through the network. Also similar, the operations of the media gateway 333 and redundant media gateway 310 may be performed by a session border controller device. However, in this particular network architecture 300, a last resource disaster recovery mechanism is included for use during catastrophic or widespread outages in the network to ensure that certain communications are connected to a destination device.

As described above, a widespread network outage may result in the routing devices 340, 306 of the network becoming unavailable to provide routing instructions for received communications or may provide incorrect or improper routing instructions to requesting devices. For example, the routing devices 340, 308 may each become unreachable by the SBCs 302-206 of the network 300 due to an incorrect provisioning of the components or power issues with the components. In such a circumstance, the routing devices 340, 308 may return no answer or an error message when contacted by an SBC 302 for information on how to route a received communication. More particularly, during a typical call flow for a communication, the SBC 302 receives a communication from the customer network 322 for termination at a destination device connected to egress network 342. As explained above, the SBC 302 contacts a routing device 340 to request routing information through the network 300 to reach the intended destination device. In some instances, however, the routing device 340 is unreachable (due to some type of failure condition) such that the routing device fails to provide routing information to the requesting SBC 302. In another example, the routing device 340 may determine that the received communication is a part of an attack on the network or component of the network and may instruct the SBC 302 to not route the communication to the destination device. Regardless of the reason for re-routing, the SBC 302 may attempt to contact a redundant or back-up routing device, such as routing device 308 to terminate the communication. However, in still other circumstances, redundant routing device 308 may also return a no answer or improper or no routing path available through the network 300. This circumstance is referred to herein as a widespread outage in the network 300.

To address the widespread outage in the network 300, one or more of the edge devices of the network 300 (such as SBC 302) may be configured or provisioned to route received communications to a dedicated last resource disaster routing device 311 when one or more of the routing devices 340, 308 provide a "no answer" or a "no route" reply due to a widespread outage in the network. In general, the last resource disaster routing device 311 is an edge networking device or other type of routing network component that is configured to receive a communication and automatically route the communication as configured. In one particular example, the last resource disaster routing device 311 is a disaster recovery SBC device. However, the last resource disaster routing device 311 may be any type of networking device, such as a media gateway, a switch, or any other type of network device. Further, the disaster recovery SBC 311 may be connected or otherwise in communication with a third party telecommunications network 314 that utilizes networking components that are different than those components utilized by the originally receiving network 300. In one implementation, the third party network 314 is operated and maintained by an entity different then the administrator or operator of the originally receiving network 300. While referred to herein as a third party network, it may indeed be operated by the same entity as the receiving network 300. Because the third party telecommunications network 314 utilizes different network components, the outage affecting the network 300 may not similarly affect the third party network such that a communication packet transmitted to the third party network may reach the destination device.

In general, the third party network 314 may receive the communication from the disaster recovery SBC 311 and connect the communication to the destination device as a typical network call flow. That is, the third party network 314 may also connect to or otherwise be in communication with the egress network 342 and may provide the communication to the egress network for connection to the intended destination device. In this manner, a received communication may still be terminated with the intended destination device during widespread network outages of a telecommunications network 300.

As mentioned, the disaster recovery SBC 311 is configured or provisioned to automatically transmit received communications to the third party network 314. In other words, the disaster recovery SBC 311 does not request transmitting information from a routing device 340, 308 of the network 300. Rather, as the routing devices 340, 308 have been determined by the network 300 to be affected by the network outage, the disaster recovery SBC 311 transmits any received communication directly to the third party network 314 for further routing to the egress network 342. The SBC 311 is thus programmable by a network administrator or other operator to route received communications to any third party network 314 in communication with the disaster recovery SBC 311 as determined by the network administrator. It should be appreciated that the disaster recovery SBC 311 may be configured or programmed to route all received communications to any network or network component, as desired or designed by the network administrator. For example, a first disaster recovery SBC 311 may be programmed or configured to automatically route communications to a first third-party network 314, while a back-up or redundant disaster recovery SBC 312 may be configured to route communications to also route the communication to the first third-party network or configured to route the communication to a second third-party network (not shown). This embodiment may be utilized to ensure connection of the received communication if the widespread outage also affects the first third-party network 314. However, typically outages are limited to a particular network or location such that outages do not often affect two separate telecommunication networks and the communication may be transmitted to the egress network 342 through the third party network 314.

As mentioned, in some implementations a redundant disaster recovery SBC 312 may also be included in the telecommunication network 300. The redundant disaster recovery SBC 312 may also be in communication with the SBCs 302-206 of the network 300 to receive communications during a detected network outage. The disaster recovery SBC 312 may be configured to operate in the same manner as the main disaster recovery SBC 311. That is, the redundant disaster recovery SBC 312 may receive an incoming communication and automatically transmit the communication to the third party network 314 for transmission and connection to the egress network 342 and the intended destination device.

In some embodiments of the network 300, only certain types of communications that are identified by the network 300 upon receipt may utilize the disaster recovery SBC 310. For example, the network 300 may be configured to provide the last resource disaster recovery for emergency communications, such as telephone calls to a 911 center or other emergency center. The receiving SBC 302 of the network 300 may identify the incoming communication as an emergency communication based on routing information included with the communication and attempt to route the communication through the network 300 as described above. However, if the routing devices 340, 308 of the network 300 provide no routing information, the SBC 302 may be configured to instead provide the emergency communication to the disaster recovery SBC 311 and the third-party network 314 for routing to the destination emergency center. In other embodiments, communications intended for a particular customer of the network 300 (or originating from a particular customer of the network) may be provided with the last resource disaster routing feature. In other words, the last resource disaster routing described herein may be a feature that an administrator or operator of the network 300 may offer or sell to customers of the network to provide additional reliability to communications hosted by the network. In general, any classification or type of communication received at the network 300 may be provided with the last resource disaster routing feature described herein.

In general, the ingress edge device (or SBC 302) of the network 300 that receives the incoming communication may identify the type of communication for last resource disaster recovery in any manner. In one particular embodiment, the types of communications that are eligible for routing to the disaster recovery SBC 311 may be identified by the trunk group over which the communication is received. For example, all or a portion of emergency communications received at the network 300 may be received from a dedicated trunk group connection to the network. Thus, the SBCs 302-306 of the network 300 may be configured to route all communications received on the dedicated trunk group to the disaster recovery SBC 311 when routing instructions from the routing devices 340, 308 are not received. In other embodiments, the SBC 302 may perform some analysis of the received communication to determine a destination or origin of the communication. For example, the SBC 302 may extract a dialed telephone number identifier from the communication and determine an intended destination for the communication. If the intended destination belongs to a customer of the network 300 that has purchased the last resource disaster routing service, the SBC 302 may perform the routing to the disaster recovery SBC 311 as described above when the routing devices 340, 308 do not return a proper route through the network. Similarly, the SBC 302 may be configured to extract an origin telephone number identifier and route the communication to the disaster recovery SBC 311 if the originating device is associated with the service provided by the network 300. Regardless of the method utilized, the SBC 302 is configured to identify if a received communication should be routed to the disaster recovery SBC 311 in the event of a widespread outage in the network 300 and route the communication accordingly.

Figure 4:
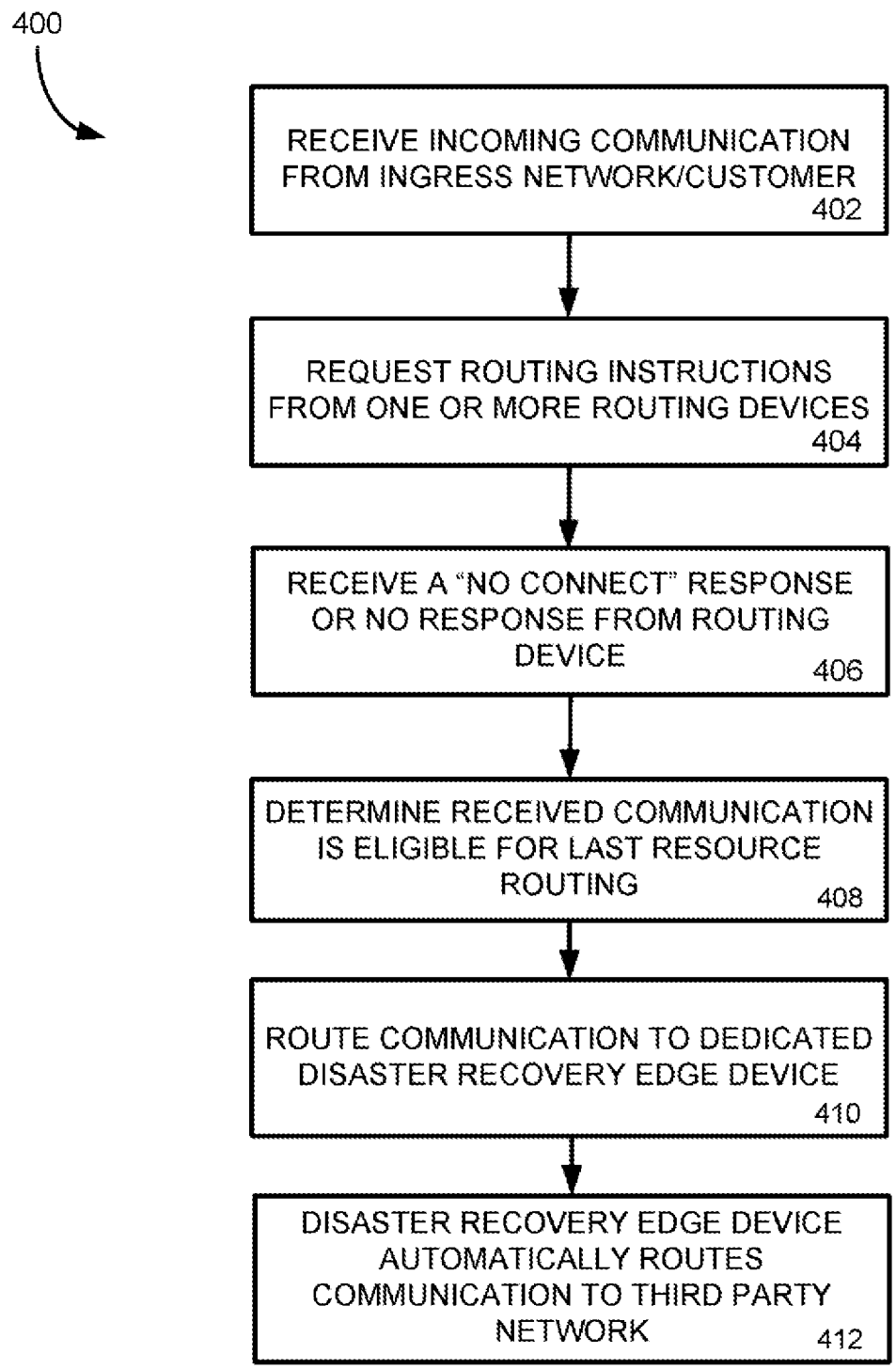
FIG. 4 is a flowchart of a method for routing a communication from a particular source or to a particular destination during a network outage utilizing a last resource disaster recovery architecture.

FIG. 4 is a flowchart of a method 400 for routing a communication from a source device to a destination device through a telecommunications network during a network outage utilizing a last resource disaster recovery architecture. In general, the operations of the method 400 may be performed by any component of or related to the network 300 of FIG. 3. In one particular embodiment, one or more the operations are performed by an ingress SBC 302 of the network while other operations are performed by a disaster recovery SBC 311. Through the method 400, a telecommunications network 300 may provide last resource disaster routing during periods of widespread outages within the network to ensure that particular communications are routed to or terminated at a destination communication device.

Beginning in operation 402, the network 300 receives an incoming communication from a particular ingress network or customer 322. In some embodiments, the communication is received through a dedicated trunk group connected to or in communication with the network 300. In operation 404, the receiving edge device 302 contacts one or more routing devices 340, 308 of the network 300 to determine a routing path through the network 300. However, during moments of outages within the network 300 (or other instances, such as an incorrect provisioning of the components of the network), the routing devices may be offline or may return a "no connect" instruction in operation 406. Such a "no connect" instruction may include a no reply from the routing device, a reply with no route through the network found, a reply instructing the requesting device to ignore the communication, and the like.

When a no connect instruction is received, the edge requesting device 302 may determine, in operation 408, if the received communication is eligible for last resource disaster routing. For example, the edge device 302 may determine that the communication is received from a dedicated trunk group, such as a trunk group dedicated to emergency communications. In another example, the edge device 302 may extract some information from the received communication (such as a dialed destination telephone number identifier or an origination telephone number identifier) and determine if a customer associated with the extracted information has purchased the last resource disaster routing service from the network 300. If the edge device determines that the communication is eligible for the last resource routing, the edge device than routes the communication to a dedicated disaster recovery edge device 311 in operation 410.

Upon receiving the communication from the edge device 302, the disaster recovery edge device 311 is programmed or otherwise configured to automatically route received communications to a third-party telecommunications network 314 for further routing of the communication. Thus, in operation 412, the disaster recovery edge device 311 automatically routes the received communication to a third-party telecommunications network 314. In one embodiment, the disaster recovery edge device 311 transmits all received communication to a particular edge device of the third-party network 314. In other embodiments, the disaster recovery edge device 311 is connected to more than one ingress edge device of the third-party network 314 and may route the communication to any such edge device upon receipt. In this manner, the received communication is transmitted to the third-party network 314 during a time when the routing devices 340, 308 of the network 300 may be inoperable due to a network outage of some type.

Figure 5:
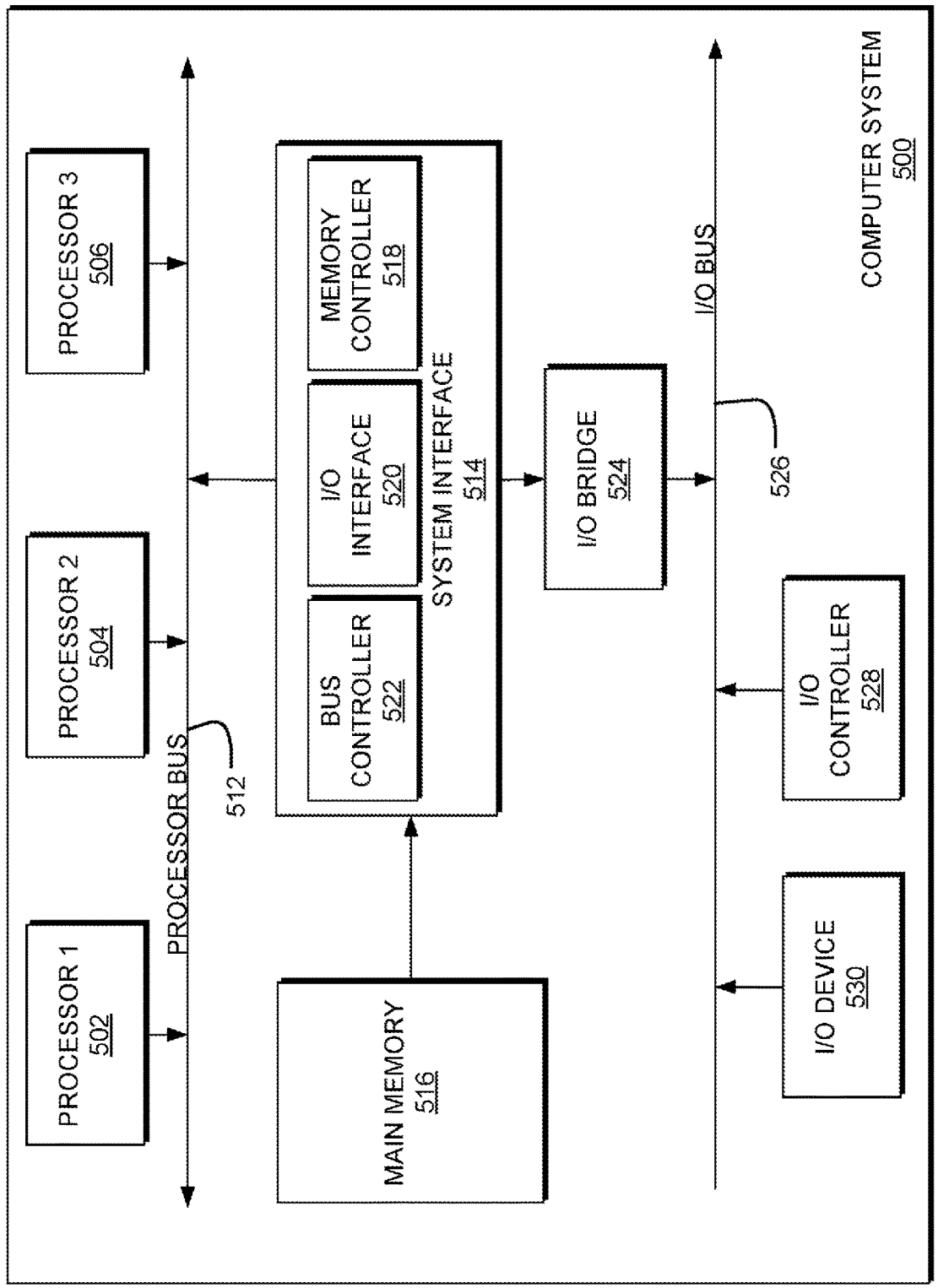
FIG. 5 is a diagram illustrating an example of a computing system which may be used in implementing embodiments of the present disclosure.

FIG. 5 is a block diagram illustrating an example of a computing device or computer system 500 which may be used in implementing the embodiments of the components of the network disclosed above. For example, the computing system 500 of FIG. 5 may be an edge device 302 of the network 300 discussed above. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. System interface 514 may be connected to the processor bus 512 to interface other components of the system 500 with the processor bus 512. For example, system interface 514 may include a memory controller 514 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 540, as illustrated.

I/O device 540 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed:

1. A method for operating a telecommunications network comprising:
   receiving, by one or more processors of a first telecommunications network, a communication;
   identifying, by the one or more processors, the communication as a particular type of network communication associated with a disaster recovery service;
   determining, by the one or more processors, a failed route path through the first telecommunications network for the received communication;
   associating, by the one or more processors, the disaster recovery service with a particular customer of the first telecommunications network; and
   transmitting, by the one or more processors, the communication to a second telecommunications network different from the first telecommunications network in response to the failed route path determination and the particular type of network communication identification.

2. The method of claim 1, wherein the determining of the failed route path through the first telecommunications network for the received communication comprises:
   transmitting, by the one or more processors, a route request to at least one routing device of the first telecommunications network based on the received communication; and
   receiving no response from the at least one routing device.

3. The method of claim 1, wherein the determining of the failed route path through the first telecommunications network for the received communication comprises:

transmitting, by the one or more processors, a route request to at least one routing device of the first telecommunications network based on the received communication; and receiving, by the one or more processors, a routing instruction from the at least one routing device of the first telecommunications network to drop the communication.

4. The method of claim 1, wherein the determining of the failed route path through the first telecommunications network for the received communication comprises:

transmitting, by the one or more processors, a route request to at least one routing device of the first telecommunications network based on the received communication; and receiving, by the one or more processors, an error message from the at least one routing device of the first telecommunications network.

5. The method of claim 1, wherein the identifying the communication as the particular type of network communication is based on routing information included in the received communication.

6. The method of claim 5, wherein the associating of the disaster recovery service with the particular customer of the first telecommunications network is in response to the routing information indicating that the communication is associated with the particular customer.

7. The method of claim 6, wherein the routing information includes a telephone number of a destination device.

8. The method of claim 6, wherein the routing information includes a telephone number of an originating device.

9. The method of claim 6, wherein the transmitting of the communication to the second telecommunications network is further in response to the associating of the disaster recovery service with the particular customer of the first telecommunications network.

10. The method of claim 1, further comprising:

configuring, by the one or more processors, a disaster recovery network device to automatically transmit received communications to the second telecommunications network; and transmitting, by the one or more processors, received communications to the disaster recovery network device to transmit the received communications to the second telecommunications network.

11. A telecommunications system comprising:

one or more processors of a first telecommunications network; and non-transient computer readable media comprising instructions that, when executed by the one or more processors, cause the one or more processors to:

receive a communication;

identify the communication as a particular type of network communication associated with a disaster recovery service;

determine a failed route path through the first telecommunications network for the received communication;

associate the disaster recovery service with a particular customer of the first telecommunications network; and transmit the communication to a second telecommunications network different from the first telecommunications network in response to the failed route path determination and the particular type of network communication identification.

12. The system of claim 11, wherein to determine the failed route path through the first telecommunications network for the received communication, the instructions further cause the one or more processors to:

transmit a route request to at least one routing device of the first telecommunications network based on the received communication; and receive no response from the at least one routing device.

13. The system of claim 11, wherein to determine the failed route path through the first telecommunications network for the received communication, the instructions further cause the one or more processors to:

transmit a route request to at least one routing device of the first telecommunications network based on the received communication; and receive a routing instruction from the at least one routing device of the first telecommunications network to drop the communication.

14. The system of claim 11, wherein to determine the failed route path through the first telecommunications network for the received communication, the instructions further cause the one or more processors to:

transmit a route request to at least one routing device of the first telecommunications network based on the received communication; and receive an error message from the at least one routing device of the first telecommunications network.

15. The system of claim 11, wherein the identifying of the communication as the particular type of network communication is based on routing information included in the received communication.

16. The system of claim 15, wherein the associating of the disaster recovery service with the particular customer of the first telecommunications network is in response to the routing information indicating that the communication is associated with the particular customer.

17. The system of claim 16, wherein the routing information includes a telephone number of a destination device.

18. The system of claim 16, wherein the routing information includes a telephone number of an originating device.

19. The system of claim 16, wherein the transmitting of the communication to the second telecommunications network is further in response to the associating of the disaster recovery service with the particular customer of the first telecommunications network.

20. The system of claim 11, wherein the instructions further cause the one or more processors to:

configure a disaster recovery network device to automatically transmit received communications to the second telecommunications network; and transmit received communications to the disaster recovery network device to transmit the received communications to the second telecommunications network.

* * * * *